United States Patent [19]

Eklund, Jr.

[11] Patent Number: 5,022,680
[45] Date of Patent: Jun. 11, 1991

[54] SPRAY-SUPPRESSANT SPLASH GUARD FOR VEHICLES

[75] Inventor: Louis E. Eklund, Jr., Muskegon, Mich.

[73] Assignee: Fleet Engineers, Inc., Muskegon, Mich.

[21] Appl. No.: 617,941

[22] Filed: Nov. 26, 1990

Related U.S. Application Data

[63] Continuation of Ser. No. 394,630, Aug. 16, 1989, abandoned, which is a continuation of Ser. No. 108,793, Oct. 16, 1987, abandoned.

[51] Int. Cl.⁵ .............................................. B62B 9/14
[52] U.S. Cl. .................................................... 280/851
[58] Field of Search ................ 280/847, 848, 851, 154

[56] References Cited

U.S. PATENT DOCUMENTS

| | | | |
|---|---|---|---|
| 3,899,192 | 8/1975 | Reddaway | 280/851 |
| 4,258,929 | 3/1981 | Brandon et al. | 280/851 |
| 4,585,243 | 4/1986 | Lockwood et al. | 280/851 |

Primary Examiner—Andres Kashnikow
Assistant Examiner—Richard Camby
Attorney, Agent, or Firm—Varnum, Riddering, Schmidt & Howlett

[57] ABSTRACT

A spray-suppressant splash guard is adapted to depend from a vehicle body rearwardly of a wheel of the body and is provided with vertically extending channel means open at least the lower end thereof and baffle means which extend from the rib in a disposition whereby spray thrown rearwardly by the vehicle wheel will enter the channel means and rebound from a splash surface of the splash guard to be intercepted, in part, by the baffle means. The portion so intercepted will be confined to the channel means for discharge at the lower open end thereof.

5 Claims, 2 Drawing Sheets

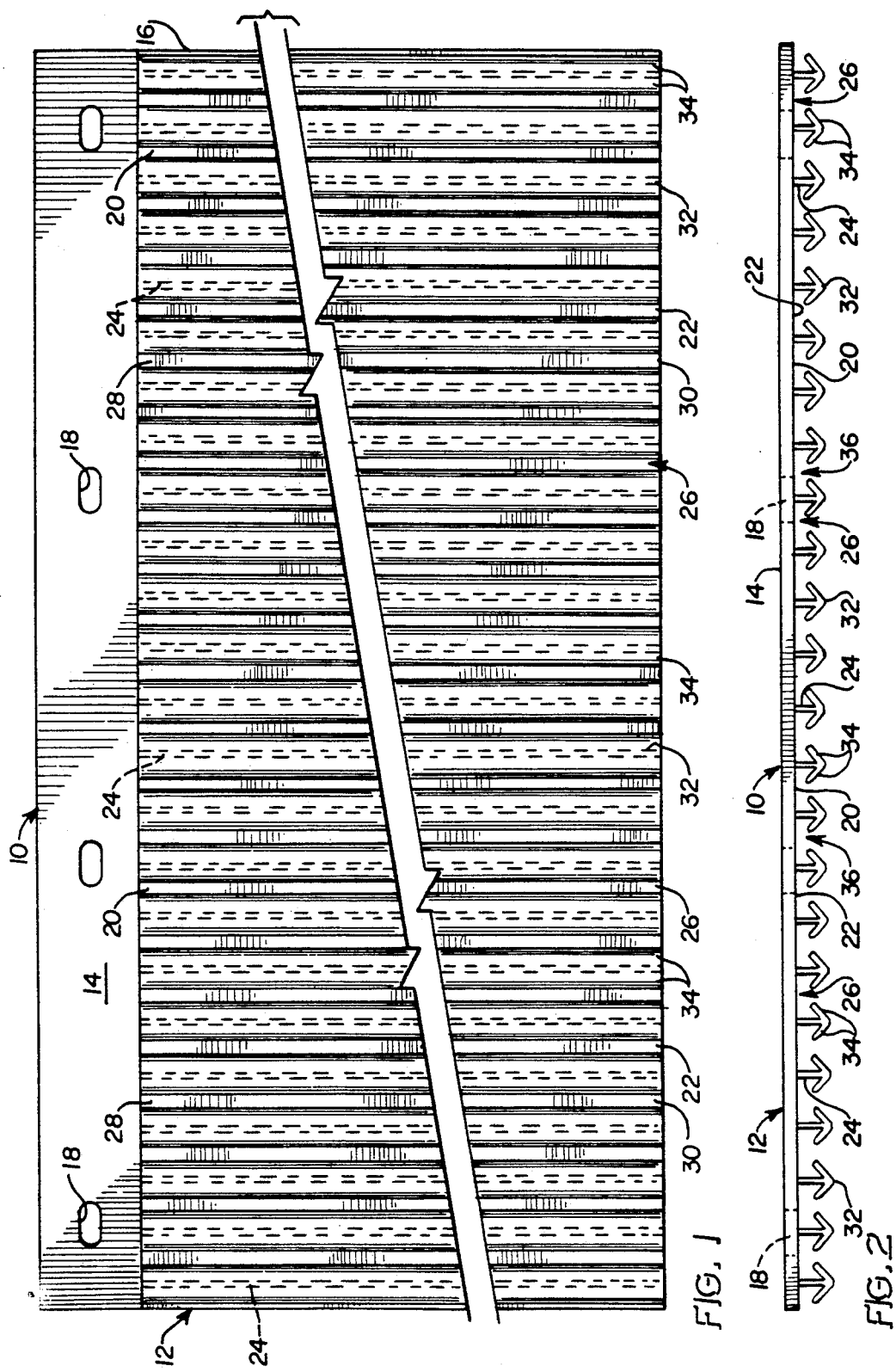

SPRAY-SUPPRESSANT SPLASH GUARD FOR VEHICLES

This is a continuation of application Ser. No. 394,630, filed Aug. 16, 1989, now abandoned, which is, in turn, a continuation of application Ser. No. 108,793, filed Oct. 16, 1987, now abandoned.

FIELD OF THE INVENTION

This invention relates to mud flaps or splash guards for vehicles, and more particularly, to splash guards intended for use with larger vehicles such as trucks and semitrailers. Still more particularly, this invention relates to splash guards of the spraysuppressant type; that is, splash guards which not only deflect spray which would otherwise be thrown rearwardly of the vehicle but also inhibit or suppress the dispersion of such spray in directions other than downwardly to the road surface.

BACKGROUND OF THE INVENTION

Though splash guards have been effectively used for many years to prevent or restrict spray from being thrown rearwardly by the wheels of a vehicle into the path of other vehicles following in the same direction, laterally projected spray has continued to be a problem. Such spray not only obstructs the vision of drivers of following vehicles but also of those overtaking or proceeding alongside the offending vehicle. In the case of roads or thoroughfares not provided with a median strip or solid barrier to separate vehicles moving in opposite directions, laterally thrown spray in large volume may also be a hazard to vehicles passing in the opposite direction.

Numerous expedients have been devised to meet this problem, among them, for example, the splash guard disclosed in U.S. Pat. No. 4,585,243, issued Apr. 29, 1986 to J. R. Lockwood and L. A. Loeffler. Here, an arrangement of conical projections and vertically oriented ribs extend toward the vehicle wheel from a splash surface to form channels intended to direct spray in a downward direction. The ribs have nonplanar side wall surfaces whereby, in cooperation with the conical projections, they form channels which increase in width in the direction toward the vehicle wheel so that their widest portions are those closest to the wheel. Thus, much of the spray rebounding from the splash surface is free to issue laterally from the channels and in other directions as well.

Another approach to the problem is exemplified by the splash guard disclosed in U.S. Pat. No. 3,899,192, issued Aug. 12, 1975 to W. W. Reddaway, which comprises a dense multitude of narrow, flexible blade elements extending generally toward the vehicle wheel in a construction like that of artificial turf, the blade elements forming a tangled mass which completely covers the splash surface, whereby the splash guard is said to capture spray and allow it to drain downwardly toward the surface of the road. However, in the presence of freezing conditions, moisture and solid particles entrapped in the mass of blades tend to accrete and form an impenetrable barrier which destroys or drastically reduces effectiveness and is extremely difficult to remove.

SUMMARY OF THE INVENTION

In a splash guard according to the present invention, rib means project outwardly from a splash surface to define therewith vertically extending channel means open at at least the lower end thereof, and baffle means extend from the rib means in a disposition, whereby spray thrown rearwardly by the vehicle wheel will enter the channel means and rebound from the splash surface to be intercepted, in part, by the baffle means. The portion so intercepted will thus be confined to the channel means for discharge at the lower open end thereof. Even if the channel means should tend to clog in the presence of freezing conditions, such a construction facilitates clearing of the channel means.

Further features, objects and advantages of the invention and preferred embodiments thereof will be apparent from the ensuing description taken in conjunction with the accompanying drawings.

THE DRAWINGS

In the drawings:

FIG. 1 is a front elevational view of a first preferred embodiment of a splash guard in accordance with the invention, shown as broken and foreshortened in the interest of economy of space;

FIG. 2 is a plan view from above of the splash guard of FIG. 1;

THE PREFERRED EMBODIMENTS

Figure 3:
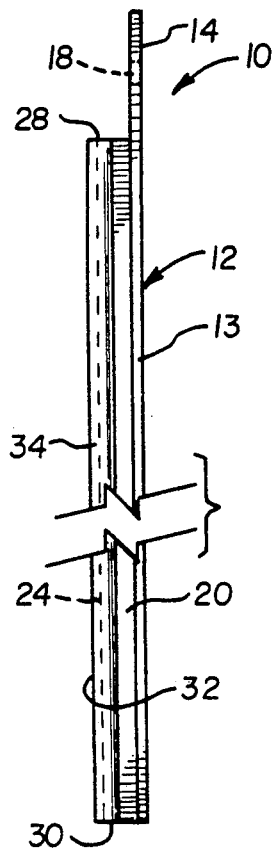
FIG. 3 is a side elevational view of the splash guard of FIG. 1 taken from the right-hand side thereof and broken and foreshortened as in FIG. 1.

Referring particularly to FIGS. 1, 2 and 3, there is depicted a mud flap or splash guard 10 which comprises, fundamentally, a panel 12 having a base 13. An upper portion of base 13 comprises a mounting strip 14. Mounting strip 14 is provided with suitable means, such as apertures 18, for fastening panel 12 to a mounting fixture or bracket so that it may be mounted on a vehicle in depending relation thereto and rearwardly of a wheel of the vehicle.

Panel 12 also includes a ribbed portion 20 supported on base 13 and having a splash surface 22. It will be apparent that the splash guard is intended to be mounted in a position such that the splash surface 22 will be in confronting relation to a rearward portion of the wheel with which it is associated.

Projecting outwardly from the splash surface is a plurality of parallel, elongate ribs 24. Each pair of adjacent ones of ribs 24 cooperate with splash surface 22 to define an elongate channel 26 having opposite open ends 28, 30, one of which comprises a lowermost discharge end 30.

Each of ribs 24 terminates in a distal edge 32 spaced from splash surface 22.

Disposed along each of the ribs and extending oppositely from the distal edge thereof are a pair of baffles 34. Each baffle extends diagonally toward splash surface 22 from the distal edge of the respective rib and into the corresponding channel 26. In the embodiment of FIGS. 1 to 3, the baffles are of equal width and each forms an angle of 45 degrees with its respective rib.

Figure 4:
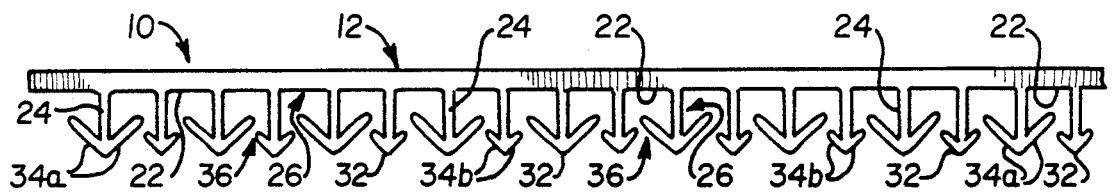
FIG. 4 is a partial plan profile similar to FIG. 2 but representing a second preferred embodiment of a splash guard constructed in accordance with the present invention.

Similarly, baffles 34a and 34b of the embodiment of FIG. 4 form angles of 45 degrees with the respective ribs from which they extend. However, the baffles of 34a of alternate ribs are greater in width than the baffles 34b of intervening ribs.

Figure 5:
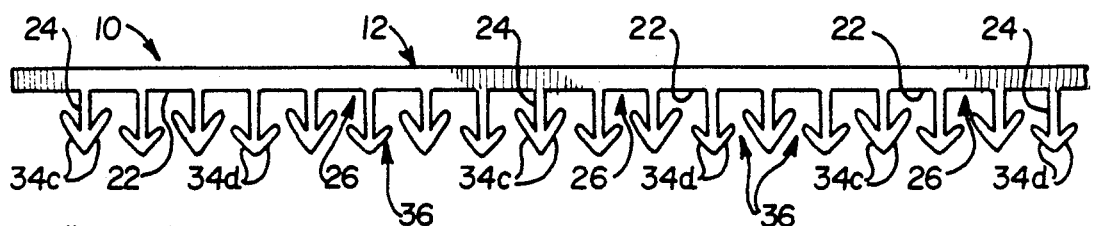
FIG. 5 is a partial plan profile similar to FIG. 2 but representing a third preferred embodiment of a splash guard constructed in accordance with the present invention.

In the embodiment of FIG. 5, not only are the baffles 34c of alternate ribs greater in width than the baffles 34d of the intervening ribs, but each forms an angle of 30 degrees with its respective rib, whereas each of the baffles 34d of the intervening ribs forms an angle of 45 degrees with is respective rib as in the embodiments of FIGS. 1 and 4.

The baffles of all three of the illustrated embodiments are spaced from one another to form elongate openings 36 therebetween. However, with the construction shown and described in connection with the embodiments of FIGS. 4 and 5, the openings 36 will not be apparent when viewed from the direction of the associated wheel; that is, no portion of splash surface 22 will be visible by way of openings 36 in the case of the latter two embodiments.

OPERATION

Though the manner of functioning of a splash guard constructed in accordance with the invention will be readily apparent, it is briefly described as follows.

Spray thrown rearwardly by the associated vehicle wheel will enter the channels 26 by way of the elongate openings 36 provided between adjacent pairs of baffles 34 where it will rebound from splash surface 22. A large portion of the rebounding spray will be intercepted by each baffle 34 and thereby confined to the respective channel 26 and will not be thrown laterally of the vehicle. Some of this spray may exit from uppermost open end 28 of the respective channel, depending upon the initial force and velocity of the spray, but much to is will be discharged to the road surface from lowermost end 30 of the channel.

At or near conditions in which the spray has a tendency to freeze, the channels may become clogged with icy or slushy matter whereby they will be unable to receive additional spray. The channels can readily be cleared by flexing the splash guards about horizontal axes to break up the slush or ice.

It will be recognized that a splash guard according to the invention can be economically manufactured since it is admirably suited to well-known extrusion processes.

Though preferred embodiments of the invention have been described herewith with particularity, this is by way of illustration and not of limitation, and the appended claims should be construed as broadly as the prior art will permit.

What is claimed is:

1. In a splash guard for deflecting spray thrown by a wheel of a vehicle, the splash guard comprising a panel having a splash surface and a plurality of parallel elongate ribs, each of the ribs projecting outwardly from the splash surface to terminate in a distal edge spaced from the splash surface, the panel being adapted to depend from a body of a vehicle in a position whereby the splash surface will confront a rearward portion of a wheel of the vehicle and the ribs will be vertically oriented with the distal edges of the ribs spaced from the rearward wheel portion, the improvement wherein each of at least a plurality of the ribs is provided with a pair of elongate baffles equal in width and extending oppositely from the distal edge of said rib and toward the splash surface, each of the baffles having an inner surface confronting the spray surface and an outer surface opposite the inner surface, the baffles extending from alternate ones of the plurality of ribs being narrower in width that the baffles extending from the others of the plurality of ribs, whereby spray thrown by a wheel of a vehicle and striking the outer surface of the baffles will be directed toward the splash surface, and a portion of spray thrown by a wheel of a vehicle and rebounding from the splash surface will strike the inner surface of the baffles.

2. In a splash guard according to claim 1, wherein each of the baffles extending from said alternates ones of the plurality of ribs form angles of 45 degrees with the respective rib, and the baffles extending from each of said others of the plurality of ribs form angles of 30 degrees with the respective rib.

3. In a splash guard according to claim 1, the further improvement wherein said baffles extending from alternate ones of the ribs form unequal angles with the respective ribs from which they extend.

4. In a splash guard according to claim 1, the further improvement wherein said baffles extending from alternate ones of the ribs form equal angles with the respective ribs from which they extend.

5. In a splash guard according to claim 1, the further improvement wherein said baffles extending from alternate ones of the ribs form angles of 45 degrees with the respective ribs from which they extend.

* * * * *